United States Patent
Lee et al.

(10) Patent No.: US 10,204,304 B2
(45) Date of Patent: Feb. 12, 2019

(54) VARIABILITY MODELING METHOD FOR ROLE-BASED ARCHITECTURE IN ONTOLOGY-BASED SELF-ADAPTIVE SYSTEM

(71) Applicant: AJOU UNIVERSITY INDUSTRY-ACADEMIC COOPERATION FOUNDATION, Suwon-si, Gyeonggi-do (KR)

(72) Inventors: Seokwon Lee, Suwon-si (KR); Sinyoung Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 632 days.

(21) Appl. No.: 14/937,307

(22) Filed: Nov. 10, 2015

(65) Prior Publication Data
US 2016/0371602 A1 Dec. 22, 2016

(30) Foreign Application Priority Data

Jun. 18, 2015 (KR) ........................ 10-2015-0086740

(51) Int. Cl.
*G06N 5/02* (2006.01)
(52) U.S. Cl.
CPC ................... *G06N 5/022* (2013.01)
(58) Field of Classification Search
USPC ........................................................ 706/12
See application file for complete search history.

(56) References Cited

U.S. PATENT DOCUMENTS

| | | | |
|---|---|---|---|
| 6,847,979 B2* | 1/2005 | Allemang | G06F 17/30731 345/440 |
| 9,494,273 B2* | 11/2016 | Wang | F16B 7/18 |
| 2009/0138415 A1* | 5/2009 | Lancaster | G06N 5/04 706/11 |

OTHER PUBLICATIONS

Classifying variability modeling techniques, Marco Sinnema, Sybren Deelstra, Department of Mathematics and Computer Science, University of Groningen, Information and Software Technology, vol. 49, Issue 7, Jul. 2007, pp. 717-739, Elsevier, accepted Aug. 18, 2006.*

Self-adaptation of mobile systems driven by the Common Variability Language, Gustavo G. Pascual. Mónica Pinto, Lidia Fuentes, Universidad de Málaga, Andalucía Tech, Spain, Future Generation Computer Systems, vol. 47, Jun. 2015, pp. 127-144, Elsevier, Future Generation Computer Systems.*

(Continued)

*Primary Examiner* — Michael B Holmes
(74) *Attorney, Agent, or Firm* — Sughrue Mion, PLLC

(57) ABSTRACT

In a variability modeling method implemented in a computer system to implement a self-adaptive system, the variability modeling method includes building ontology in which a target system to be modeled is defined through requirement analysis of the target system, deciding whether adaptation is required by continuously monitoring the target system and a change in environment, and when it is decided that the adaptation is required, performing reconfiguration of the target system by determining the variable point suitable for a change in context.

6 Claims, 10 Drawing Sheets

(56) References Cited

OTHER PUBLICATIONS

Using Constraint-based Optimization and Variability to Support Continuous Self-Adaptation, Carlos Parra, Daniel Romero, Sébastien Mosser, Romain Rouvoy, Laurence Duchien, Lionel Seinturier, University de Lille 1, LIFL CNRS UMR 8022, INRIA Lille-Nord Europe, France, SAC'12 Mar. 26-30, 2012, Riva del Garda, Italy, 2011 ACM 978-1-4503-0857.*

Ontologies for the internet of things, Sara Hachem, Thiago Teixeira, Valérie Issarny, INRIA Paris-Rocquencourt, MDS '11 Proceedings of the 8th Middleware Doctoral Symposium, Article No. 3, Lisbon, Portugal, Dec. 12-12, 2011, ACM, ISBN: 978-1-4503-1072-7.*

ACM (DL) Digital Library Models for Self-Adaptive Systems Amir Molzam Sharifloo University of Duisburg-Essen, Essen, Germany Proceeding ECSAW '15 Proceedings of the 2015 European Conference on Software Architecture Workshops Article No. 24 pp. 1=5.*

ACM (DL) Digital Library Awareness requirements for adaptive systems, Vitor E. Silva Souza, Alexei Lapouchnian, William N. Robinson and John Mylopoulos Proceeding SEAMS '11 Proceedings of the 6th International Symposium on Software Engineering for Adaptive and Self-Managing Systems pp. 60-69.*

ScienceDirect Elsevier Journal of Systems and Software vol. 122, Dec. 2016, pp. 378-397 Self-adaptation in software-intensive cyber-physical systems: From system goals to architecture configurations Ilias Gerostathopoulos, Tomas Bures, Petr Hnetynka, Jaroslav Keznik, Michal Kit, Frantisek Plasil Noel Plou.*

IEEE Computer Society 2011 Eighth IEEE International Conference and Workshops on Engineering of Autonomic and Autonomous Systems Applying Adaptive Role-Based Model to Self-Adaptive System Constructing Problems: A Case Study Tamai Tetsuo Supasit Monpratarnchai pp. 68-78.*

Korean Office Action for corresponding Application No. 10-2015-0086740 dated Aug. 11, 2016.

Clotet Martínez, Roger, et al. "Dealing with changes in service-oriented computing through integrated goal and variability modelling." ICB—Research report 22, 2008.

Yu, Yijun, et al. From stakeholder goals to high-variability software design. Technical report csrg-509, University of Toronto, 2005.

DiVA Methodology, The DiVA Project, Mar. 17, 2015, pp. 1-3; https://sites.google.com/site/divawebsite/divastudio/diva-methodology.

Jaejoon Lee et al., "A Feature-Oriented Approach to Developing Dynamically Reconfigurable Products in Product Line Engineering", 10th International Software Product Line Conference (SPLC'06), 2006, IEEE, 10pgs.

Hyesun Lee et al., "Expressing Variability in Software Product Line Architecture Models: A Comparative Study", Software Engineering Society, Sep. 2011, pp. 77-89. vol. 24, No. 3.

* cited by examiner

FIG. 5   Behavior Feature Model

VARIABILITY MODELING METHOD FOR ROLE-BASED ARCHITECTURE IN ONTOLOGY-BASED SELF-ADAPTIVE SYSTEM

CROSS-REFERENCE TO RELATED APPLICATIONS

This application claims priority of Korean Patent Application No. 10-2015-0086740, filed on Jun. 18, 2015, in the Korean Intellectual Property Office, which is hereby incorporated by reference in its entirety.

BACKGROUND

The inventive concept relates to a self-adaptive system, and more particularly relates to a variability modeling method for a role-based architecture in an ontology-based self-adaptive system.

As environments and industries are rapidly changed, software is required to cope with the corresponding change by changing its behavior under execution. However, an engineer has difficulty in designing a system while predicting all contexts that the system will face, and hence there is required an ability where software decides a context for itself and performs adaptation on the context. Accordingly, demands on self-adaptive software as software which recognizes an environment changed under execution and performs adaptation on the environment for itself are increased.

Many methodologies have been proposed to develop the self-adaptive software. In a method of developing a self-adaptive system by using a role, the role is not an actual entity but a virtual entity. The role provides flexibility in system configuration, and assists software elements to be loosely coupled, thereby assisting the behavior and configuration of the software to be changed under execution. In a role-oriented adaptive design (ROAD) methodology, a decision masking process performed in an adaptation process is not specifically presented, and therefore, an organizer role performs adaptation on a context while performing the adaptation process defined by the engineer. However, the self-adaptive system using a role concept has no guideline on how to design the adaptation process to be performed by the organizer role and through which order and process the system is to perform adaptation. Therefore, it is difficult to design the adaptation process.

The inventive concept is directed to a variability modeling method including two kinds of feature models for enabling a self-adaptive system using a role-based architecture to consider a larger number of variabilities in a self-adaptation process and a metal model for assisting a configuration between the models.

Also, the inventive concept is directed to an ontology-based self-adaptive system which can search for an appropriate solution in various and complex contexts by using the variability modeling method.

SUMMARY

According to an aspect of the inventive concept, there is provided a variability modeling method implemented in a computer system to implement a self-adaptive system, the variability modeling method comprising: building ontology in which a target system to be modeled is defined through requirement analysis of the target system, wherein, in the ontology, a behavior feature required to achieve a goal of the target system and a component feature to perform the behavior feature are related to roles and players of a role-based architecture, and a variable point is defined in their relation; deciding whether adaptation is required by continuously monitoring the target system and a change in environment; and when it is decided that the adaptation is required, performing reconfiguration of the target system by determining the variable point suitable for a change in context.

BRIEF DESCRIPTION OF THE FIGURES

The above and other aspects, features and advantages of certain exemplary embodiments of the inventive concept will be more apparent from the following description taken in conjunction with the accompanying drawings, in which.

DETAILED DESCRIPTION OF EXEMPLARY EMBODIMENTS

Figure 1:
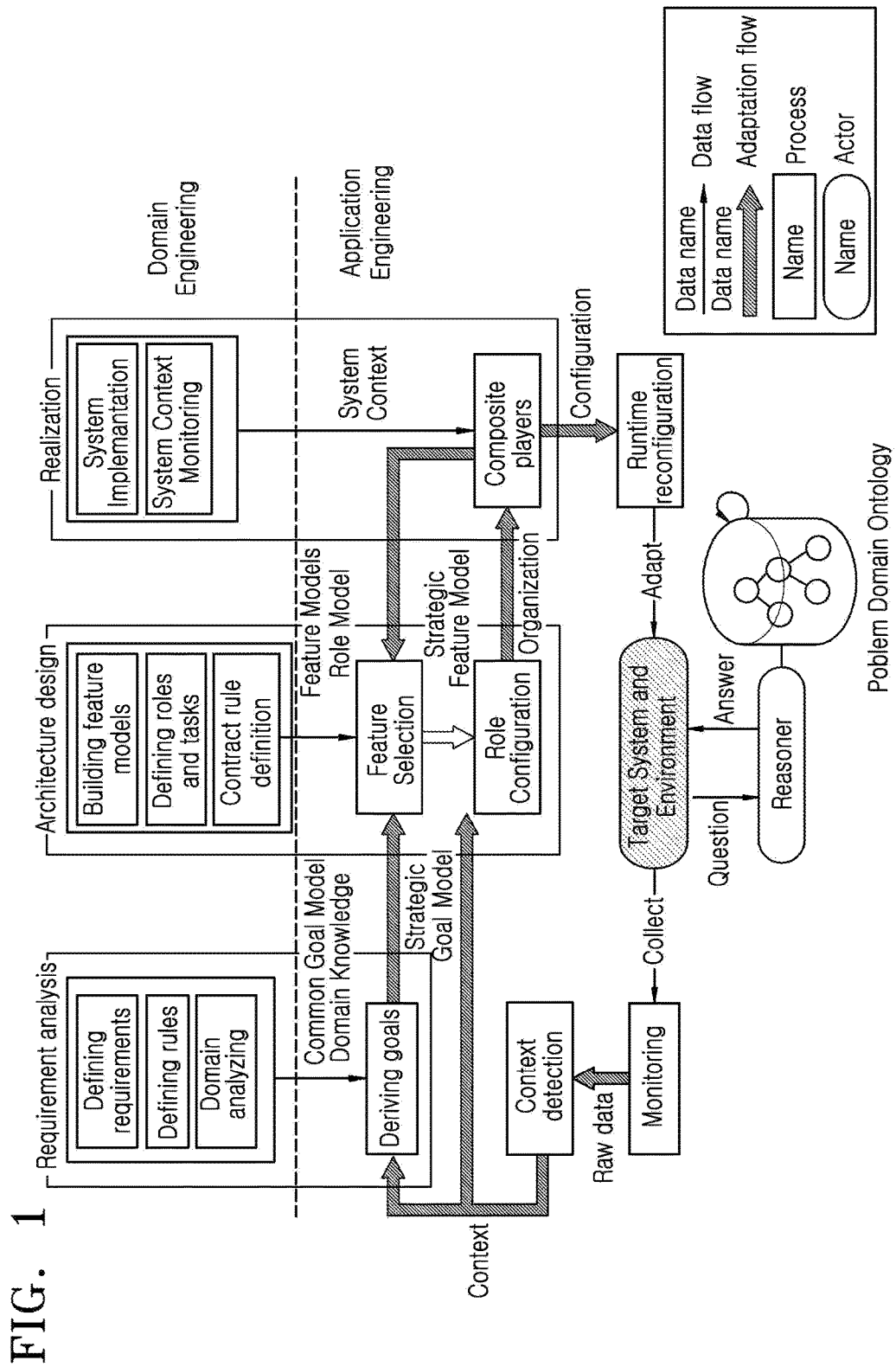
FIG. 1 is an overview of a NiSE framework for designing a self-adaptive system applied to a variability modeling method according to an embodiment of the inventive concept.

Various modifications and changes may be applied to the exemplary embodiments in accordance with the concept of the inventive concept so that the exemplary embodiments will be illustrated in the drawings and described in detail in the specification. However, the exemplary embodiments according to the concept of the inventive concept is not limited to the specific embodiments, but includes all changes, equivalents, or alternatives which are included in the spirit and technical scope of the inventive concept.

In the following description, detailed explanation of known related functions and constitutions may be omitted to avoid unnecessarily obscuring the subject manner of the inventive concept. Throughout the specification, designation numerals (e.g., "first," "second," etc.) are used to distinguish one element from another element for explanation purposes.

It should be understood that, when it is described that an element is "coupled" or "connected" to another element, the element may be directly coupled or directly connected to the other element or coupled or connected to the other element through a third element. Throughout this specification, when an element is referred to as "comprises," "includes," or "has" a component, it does not preclude another component but may further include the other component unless the context clearly indicates otherwise. Also, as used herein, the terms "unit," "module," etc., denote a unit of processing at least one function or operation, and may be implemented as hardware, software, or combination of hardware and software.

A variability modeling method for a role-based architecture in an ontology-based self-adaptive system according to an embodiment of the inventive concept first employs a feature modeling technique of software product line engineering (SPLE) in view of a conceptual idea. Feature-oriented domain analysis methodology of SPLE is one of variability modeling techniques, and assists to make a decision by considering all possible configurations when a feature model is used in a self-adaptation process. That is, in the embodiment of the inventive concept, there is proposes a modeling technique which enables better various adaptation solutions to be configured by considering variability through a feature model in an adaptation process performed by an organizer role while proposing a framework for the self-adaptive system.

Also, the variability modeling method according to the embodiment of the inventive concept is a methodology for expressing contradictory requirements in an adaptation process of the self-adaptive system, which uses the concept of a strategic rationale (SR) model of i*framework. A self-adaptive system obtained by considering a goal of system stakeholders and their correlation can be designed through the SR model. Further, the self-adaptive system can assist to create a feature model and a role-based architecture.

Also, in the variability modeling method according to the embodiment of the inventive concept, knowledges and contexts of a system and an environment are expressed as ontology, so that the self-adaptive system can produce an adaptation result obtained by considering a complex context.

Before detailed description of the variability modeling method according to the embodiment of the inventive concept, the concepts of a feature model, ontology, and a role-based architecture for adaptive design (ROAD) will be first described as the above-described fundamental background knowledge.

Feature Model

The feature model can be used to implement the self-adaptive system. Each feature extracted through the analysis of requirements of a specific system domain to be modeled is coupled to a goal model to be formulated. The feature model expresses common knowledge in the corresponding domain, and expresses restrictions of variants. Thus, the feature model can be used when a system configuration is created by selecting variants in runtime.

In the embodiment of the inventive concept, the feature model can also be used as a basic model for expressing variability. Also, in order to reinforce the reliability of the feature model, there is used a method of expressing requirements of the corresponding domain as an SR model that is a goal-oriented modeling method of i*framework, and designing a feature model from the features of the domain. In the SR model of i*framework, a system is designed by expressing, as links, relations among an actor, a goal, a softgoal, a task, and a resource.

In the embodiment of the inventive concept, the feature model is divided into a behavior feature model and a component feature model. The behavior feature model can be derived by analyzing behaviors performed on a system of a corresponding domain through the analysis of requirements. In this case, behavior features are bound in units of related behaviors required to achieve a specific goal. When a context requiring a change occurs, adaptation is performed by selecting features in the bound unit. In the embodiment of the inventive concept, adaptation is performed by selecting behavior features required to perform the adaptation corresponding to a change in context and then selecting component features capable of performing each behavior based on the selected behavior features. The two feature models and the method of expressing variability will be more clearly understood from descriptions related to the accompanying drawings, which will be described later.

Ontology

In general, the ontology has been used as an ontology-based search for neutral authoring, ontology as specification, common access to information, accuracy improvement of search, and reduction of search time.

For a reason similar to the above reason, the ontology has been used in SPLE fields. That is, domain knowledge is ontologized, and thus the ontology has been used to maintain the consistency of a system by using the ontologized knowledge when a new product is intended to be made.

In the embodiment of the inventive concept, all knowledges used in the self-adaptive system, relations between the knowledges, and a specific context are also ontologized. Accordingly, a more adaptive result can be derived by using ontology reasoning even in a case where the descriptive power of a corresponding system domain is weak by using only a specific model or a case where a domain having high complexity is used. This will also be more clearly understood from descriptions related to the accompanying drawings, which will be described later.

Role-Based Architecture for Adaptive Design (ROAD)

The ROAD is a design methodology for improving the adaptability of software through the concepts of a role, a contract, a player, and the like so as to create an adaptive system. The role is divided into a functional role and an organizer role, and an organizer role gathers functional roles according to a context to create an organization, so that adaptation is performed as the newly created organization is applied. The interaction between functional roles is made through a contract, and the organizer role connects the role and the player to each other. In the role-based architecture, an organizer performs adaptation while reconfiguring a system based on a role. Here, the role is not an actual entity but a virtual entity. The role provides flexibility in system configuration, and the organizer functions to manage applications, to also provide adaptability.

However, there is no guideline for developing an adaptation process of the self-adaptive system, performed by the organizer role, through only the ROAD methodology, which results in difficulty. Therefore, in the embodiment of the inventive concept, there is proposed a variability modeling technique considering variability by using a role, a player, a well-mapped feature model in an adaptation process. Also, there is proposed a framework in which an answer to a decision point required in the adaptation process is searched by using the above-described ontology.

Hereinafter, a variability modeling method for a role-based architecture in an ontology-based self-adaptive system according to an embodiment of the inventive concept will be described with reference to the accompanying drawings.

FIG. 1 is an overview of a NiSE framework for designing a self-adaptive system applied to a variability modeling method according to an embodiment of the inventive concept.

The variability modeling method of the role-based architecture in the ontology-based self-adaptive system according to an embodiment of the inventive concept has conceptually quoted the NiSE framework so as to design the self-adaptive system, and a process of SPLE has been introduced to the NiSE framework.

In the embodiment of the inventive concept, a goal model for expressing system requirements (i.e., modeling requirements of a system domain), the feature model for software design, a role-based architecture, and software realization are adapted to a context by assigning players in the role-based architecture.

Referring to FIG. 1, the process of SPLE is generally divided into a domain engineering process and an application engineering process. The domain engineering process is a process of analyzing a system domain and creating assets necessary for system configuration, and the application engineering process is a process of creating a product by combining the assets created as described above. In the self-adaptive system required to reflect a dynamic change, the concept of SPLE is to consider variability of the system in design through the domain engineering process and create an adaptation solution suitable for a corresponding context (change) in the application engineering process.

Also referring to FIG. 1, the framework for the self-adaptive system according to the embodiment of the inventive concept uses ontology in an adaptation process. In the embodiment of the inventive concept, all knowledges used in the adaptation are expressed as ontology, and an adaptation solution on which goal, behavior, and component are suitable for a context is searched through a process in which the system asks the ontology and receives an answer from the ontology in each step of the adaptation process. All the knowledges used in the adaptation process include experts' knowledges, an environmental context, a system context, process knowledge to be considered in the adaptation process, a model, and the like.

In requirement analysis of the domain engineering process, a rule used based on requirement analysis and domain analysis is defined. In the process, a goal model representing a goal to be achieved by a target system is derived. In architecture design, a feature model representing distinguishable features of the system is defined. Also, in the architecture design, specific behaviors or tasks satisfying goals derived in the requirement analysis are defined. Also, in the architecture design, roles required in the target system are specifically searched, and an organization combinable with the roles is defined. In realization, a system is actually realized, and the status of the implemented system is continuously monitored.

In requirement analysis of the application engineering process, a goal to be achieved by the system is filtered suitable for a context. If the goal is set, behaviors to be performed are searched so as to satisfy the goal. If the behaviors are determined, it is derived which role can perform each behavior. In addition, a player to actually realize each role is determined.

Figure 2:
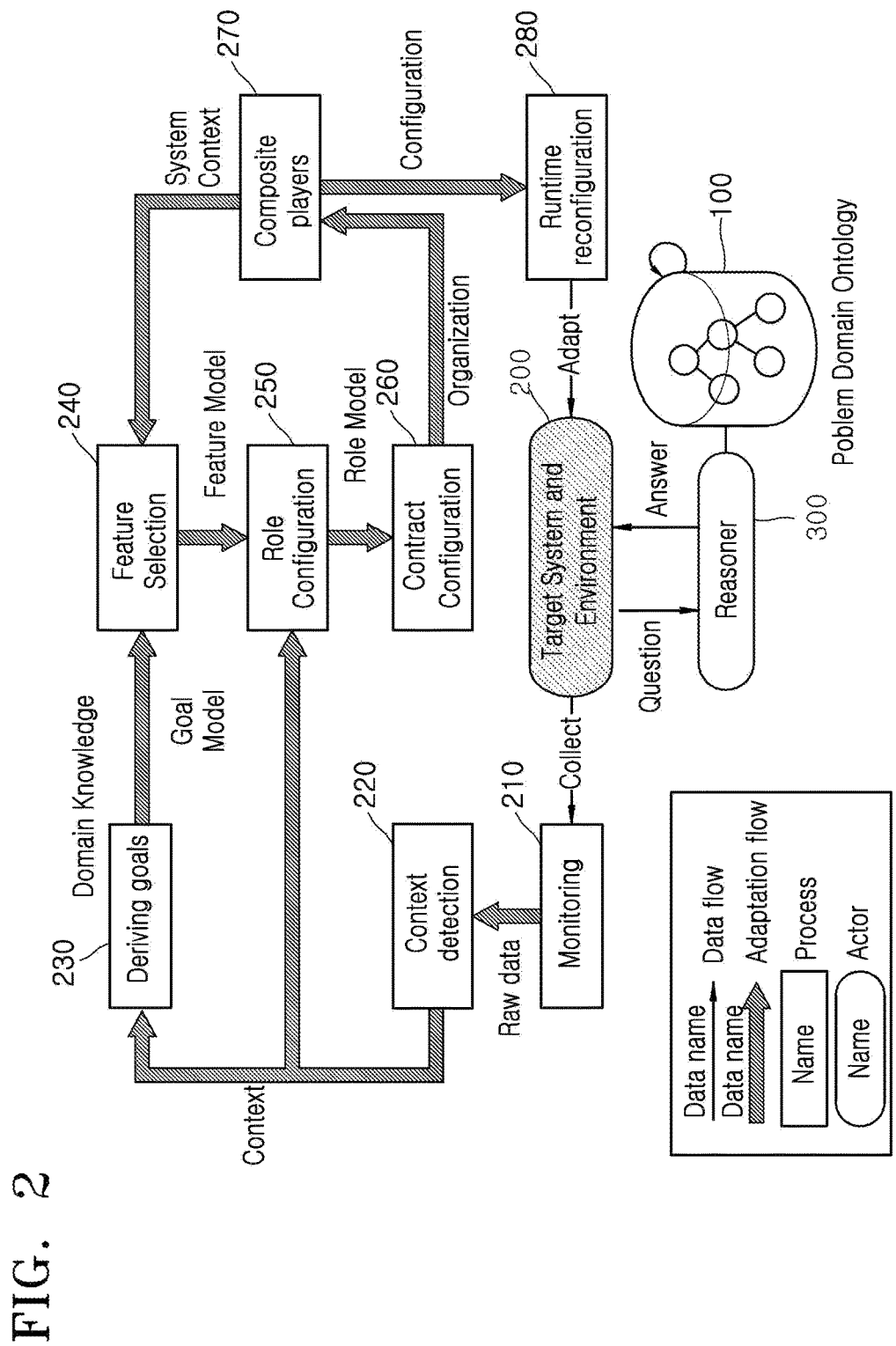
FIG. 2 is a view illustrating an adaptation process related to the variability modeling method according to the embodiment of the inventive concept.

FIG. 2 is a view illustrating an adaptation process related to the variability modeling method according to the embodiment of the inventive concept. Hereinafter, which behavior is performed in each step of the application engineering process when the framework proposed according to the embodiment of the inventive concept is placed in an adaptation context will be described with reference to FIG. 2.

Monitoring (210)

The monitoring is a step of continuously observing a change in target system and environment (200). As an example, in a smart grid system, raw data are collected from a device such as a smart meter.

Adaptation Management

The adaptation management is a step of deciding whether the adaptation process is required to solve a problem by analyzing the data collected in the monitoring (210). If it is decided that the adaptation process is required as the analysis result (see context detection of FIG. 2), it is determined from which step adaptation is required in the adaptation process.

In this case, determinable steps may be selected from i) a process of changing a goal, ii) a process of changing (selecting) a feature, iii) a process of reconfiguring a role, and iv) a process of changing a player. If a context requiring a change in goal of the system is entered as the analysis result, a change in goal is started. The goal of the system is not changed, but a behavior or component for achieving the goal is changed, so that if the adaptation is possible, the adaptation process is started from the process of selecting the feature. If the adaptation is possible as a replaceable player to perform a currently performed role is generated, it is notified that the adaptation process is to be started from the process of changing the player.

Goal Derivation (230)

In this embodiment, the system is analyzed by using the SR model of the i*framework, and the SR model is also used in the adaptation process. If it is decided that adaptation is required through a change in goal in the adaptation management, what is a goal suitable for a context is questioned to a reasoning engine (see a reasoner 300 of FIG. 2, and hereinafter, commonly referred to as the reasoner 300), and a goal suitable for a context is selected corresponding to an answer received from reasoner 300. Then, a goal and a task, which are related to the selected goal, are extracted from the SR model.

Feature Selection (240)

If a goal of the system is selected, the adaptation process proceeds to the feature selection that is a step of selecting an actual behavior required to achieve the corresponding goal and a component to perform the actual behavior. An engineer sorts behavior features and component features and creates a feature model expressing variability of each of the behavior features and the component features in a process of developing the self-adaptive system. The feature model is expressed as ontology (100), and connected to a goal model derived according to the analysis of requirements through the ontology (100) and a role-based organization expressing architectures. Accordingly, in the embodiment of the inventive concept, it can be more variously considered which solution exists in the adaptation process.

After it is detected which goal is to be satisfied in the adaptation process, a question about which behavior feature are to be performed to achieve the corresponding goal through the feature selection is asked to the reasoner (300). After it is identified which behavior features are to be performed to satisfy the corresponding goal through the question, a question about which components are required to perform the behavior features is again asked to the reasoner (300). If this process is ended, it can be seen which components are to perform and which behaviors are to be performed by the components for the purpose of adaptation.

Role Configuration (250)

The role configuration is a step of searching for roles to perform a behavior based on the selected behavior features. A system designer defines roles to be used in the adaptation process while sorting behavior features in the process of developing the self-adaptive system. The system asks the reasoner (300) what are roles derived from the searched behavior. Also, the system asks the reasoner (300) which organization can be accomplished based on the roles.

Player Composition (270)

In this step, actual players to perform the role organization determined through the previous steps are determined. Here, the player refers to a subject to actually realize component features. A question about whether there exist players capable of actually performing component features selected according to the above-described behavior features is asked to the reasoner (300). In addition, a question about whether the players are to perform the searched roles is asked to the reasoner (300). The reasoner (300) selects appropriate players based on a status of a context and statuses and abilities of the players. In this case, the roles, the component features, and the players may be previously matched through contract relations (see contract configuration (260) of FIG. 2).

Runtime Reconfiguration (280)

A role-based organization for performing adaptation on a context is created through the above-described steps, and players for performing the role-based organization are determined. Then, in this step, the determined behaviors and role-based organization are notified to the players in the system to change their behaviors.

The following Table 1 shows queries that the reasoning engine (see the reasoner (300) of FIG. 2) provides as ontology so as to derive an appropriate adaptation result according to the above-described change in context. Table 1 exemplifies a smart grid system.

Hereinafter, the SR model of i*framework applied to the embodiment of the inventive concept will be described. In the framework for the self-adaptive system, proposed in the embodiment of the inventive concept, the relation between goals and stakeholders of the system is expressed by using the SR model of i*framework. As described above, in the SR model, a system is designed by using five concepts of an actor, a goal, a softgoal, a task, and a resource.

The goal-based model of i*framework can express an internal rationale of the stakeholders of the system, and hence it is possible to express goals and dependency between various stakeholders. The self-adaptive system is to consider various interests contradictory according to contexts so as to perform adaptation in real time. In this case, the SR model of i*framework is suitable to express the various interests. The system selects one goal through the SR model, so that it can be analyzed which influence is exerted on various stakeholders. That is, the SR model expresses which goal and task actors in the system are to perform, and express which actors are required to achieve a goal and on which softgoal influence is exerted to achieve a goal.

If goals and actors of the system are expressed through i*framework, the goals and actors can be usefully used when an engineer creates a feature model for a role-based architecture. A task (more specifically, a relation between a goal and a task) in the SR model is used as an important element when a behavior feature model is created, and an actor in the SR model is used as a reference when a component feature model is created. Links used in the SR model may be referred when relations between features are specified. Here, a means-ends link is used when a goal or task is required to achieve a parent node. If several child nodes are connected to one parent node through the means-ends link, the child nodes have alternative relations therebetween. If connection is made through a task-decomposition link, this means

TABLE 1

Figure 3:
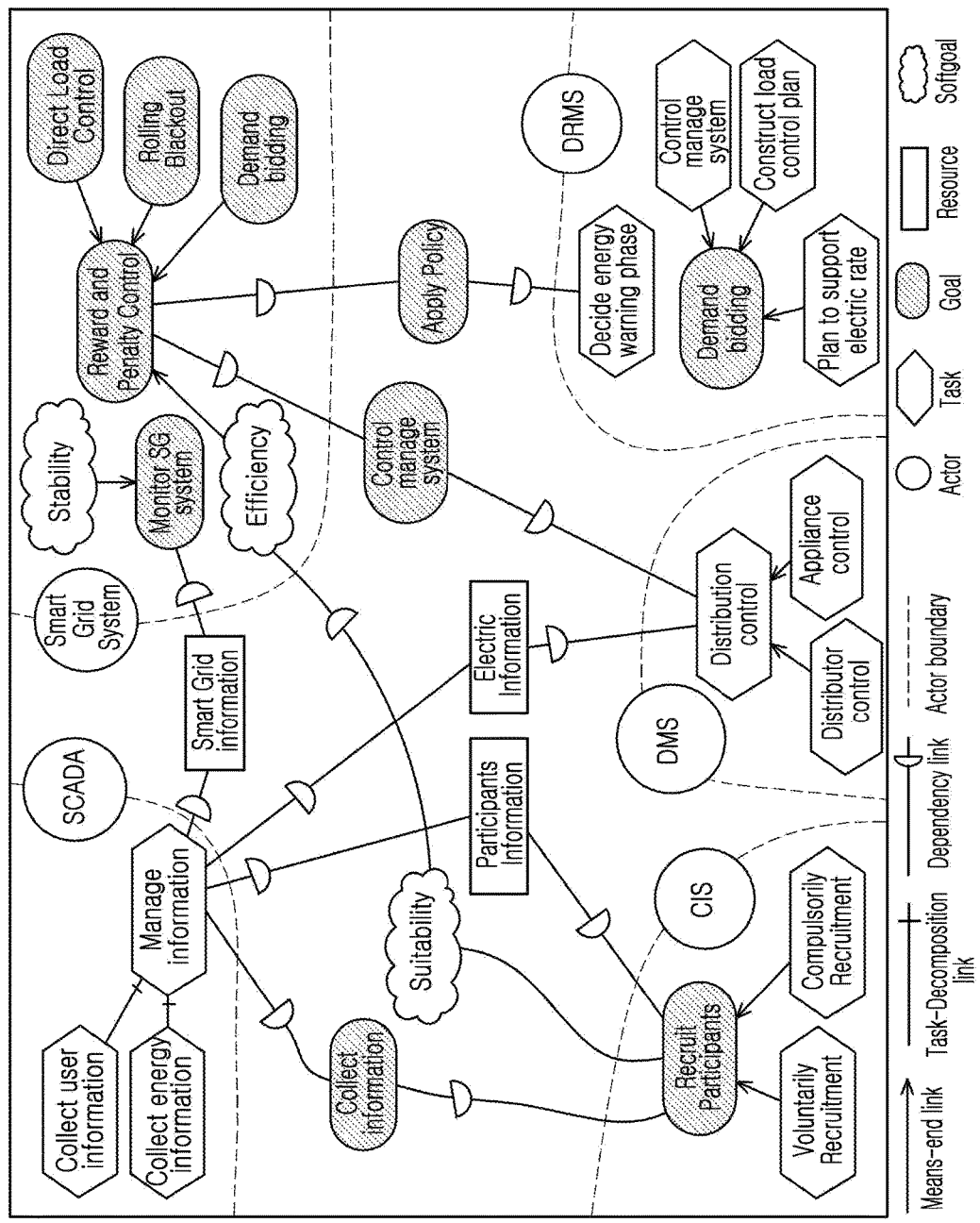
FIG. 3 illustrates that a smart grid system is modeled as a strategic rationale (SR) model of i*framework.
Figure 4:
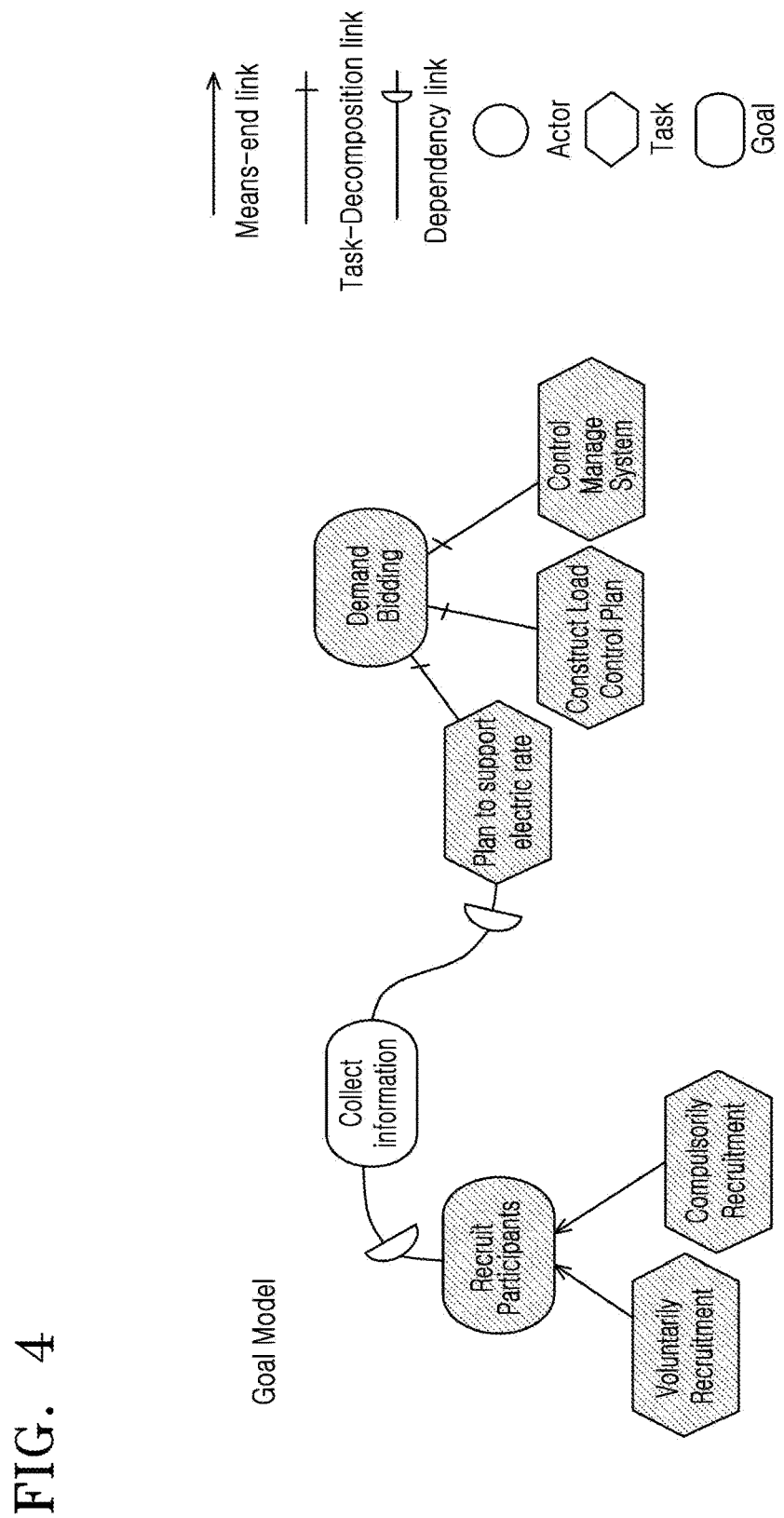
FIG. 4 illustrates a goal model when the smart grid system is modeled as the SR model of i*framework.
Figure 5:
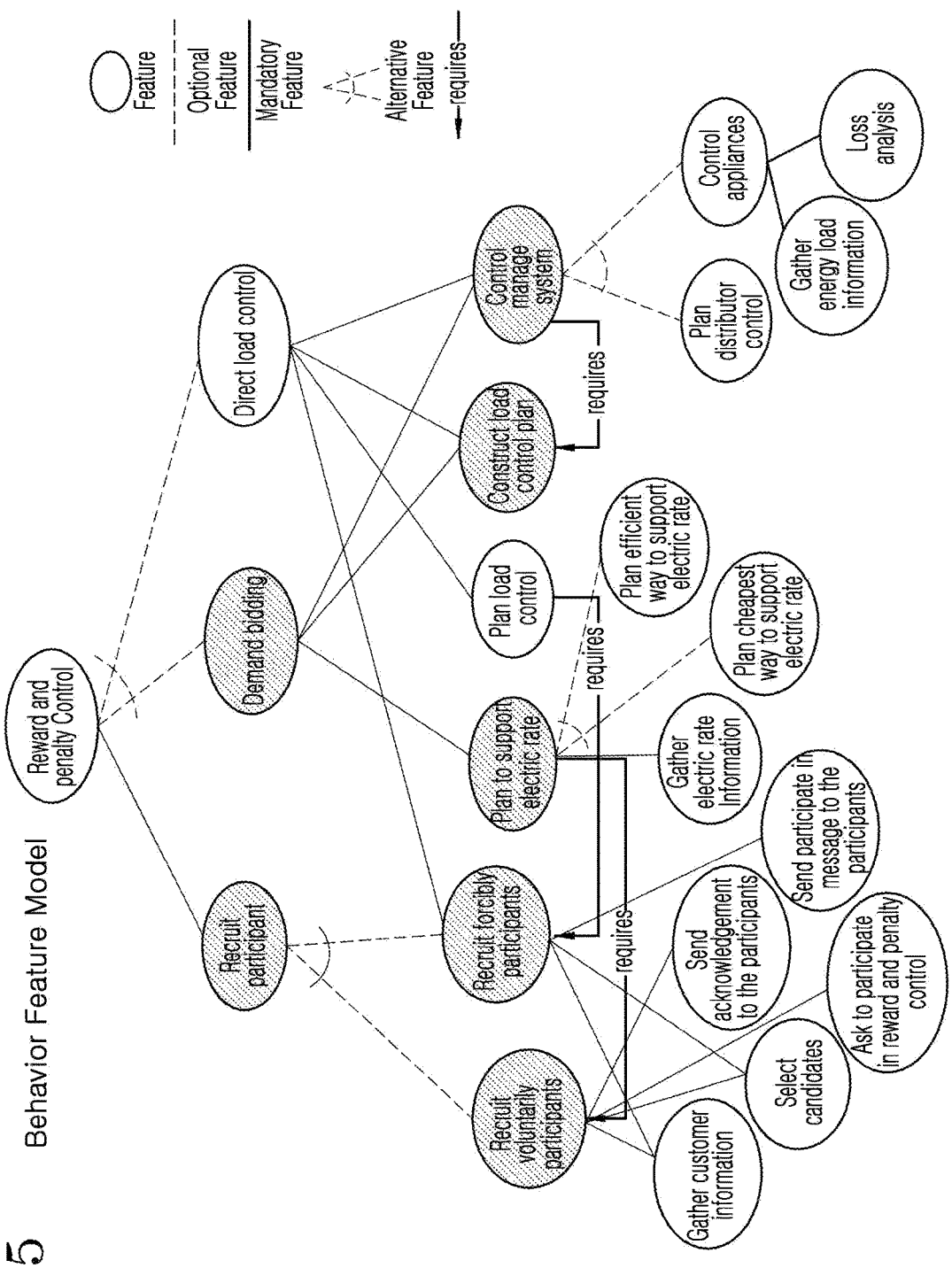
FIG. 5 illustrates a behavior feature model when the smart grid system is modeled as the SR model of i*framework.
Figure 6:
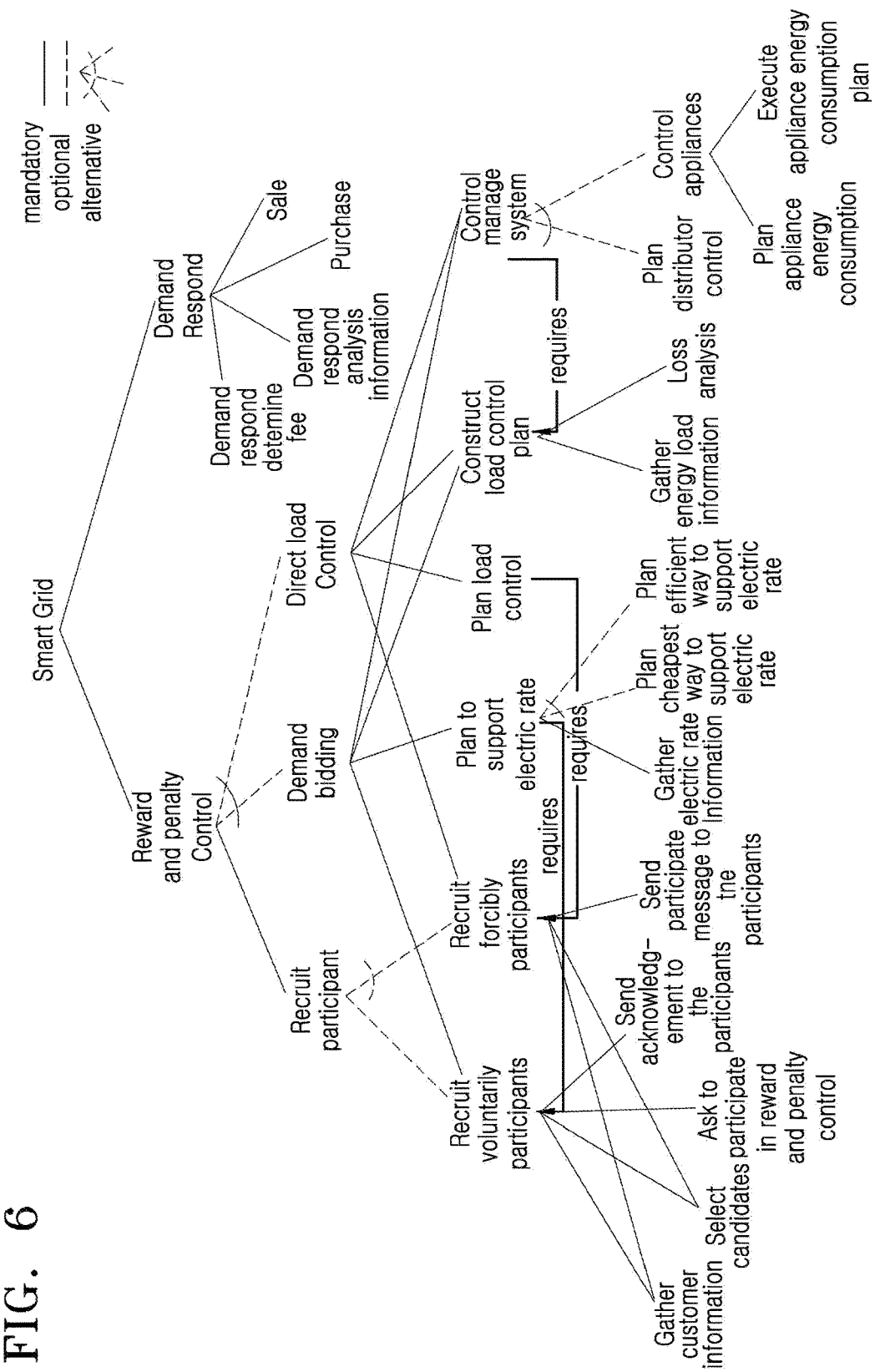
FIG. 6 illustrates an extended version of the behavior feature model of FIG. 5.
Figure 7:
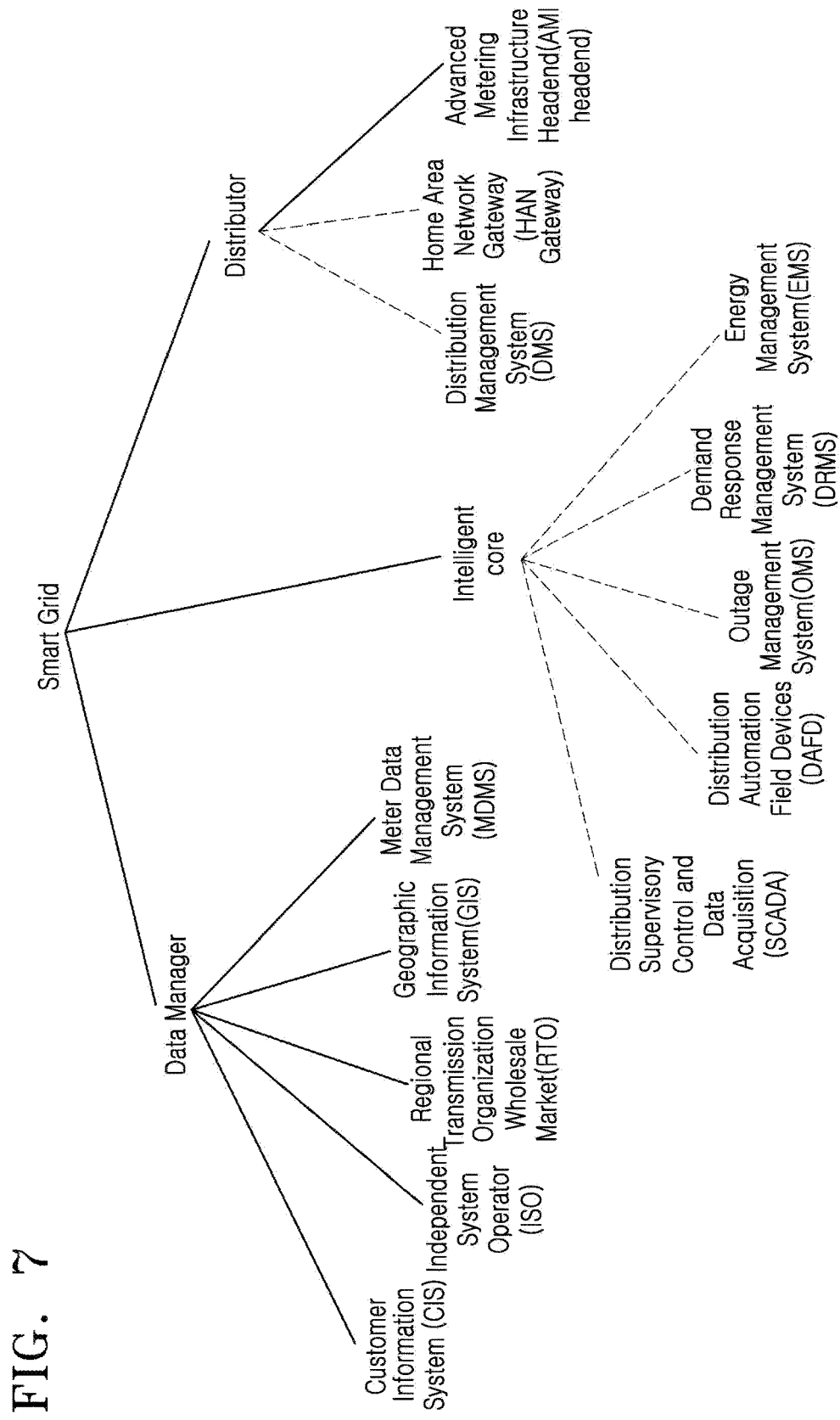
FIG. 7 illustrates a component feature model when the smart grid system is modeled as the SR model of i*framework.

| Process | Question | Query |
|---|---|---|
| Adaptation Management | Is it required to perform adaptation? | SELECT ?subject WHERE { ?subject smartGrid:triggers true} |
| | From which step is the adaptation process performed? | SELECT ?subject ?object ?type WHERE { ?subject smartGrid:givesEffectsTo ?object. ?object rdf:type ?type} |
| Requirement Modeling | Which goal is to be satisfied in a current context? | SELECT ?goal ?subgoal WHERE { ?goal smartGrid:has_subgoal ?subgoal} |
| Feature Modeling | Which behavior features are to be performed so as to satisfy selected goals? | SELECT ?features WHERE { ?goal smartGrid:is_satisfied_with ?features} |
| | Which features does a variable point correspond to among behavior features? | SELECT ?features WHERE { ?goal smartGrid:is_satisfied_with ?features ?features rdf:type smartGrid:VariablePoint.} |
| | Which component features can perform extracted behavior features? | SELECT ?component WHERE { ?features smartGrid:isPerformedBy ?component.} |
| | Which variable point features can be selected from component features? | SELECT ?component WHERE { ?features smartGrid:isPerformedBy ?component. ?component rdf:type smartGrid:VariablPoint.} |
| Role-based Organization | Which roles can perform a selected behavior feature? | SELECT ?features ?role WHERE { ?features smartGrid:isActedBy ?role} |
| | Which variable point can be selected? | SELECT ?features ?role WHERE { ?features smartGrid:isActedBy ?role. ?role rdf:type smartGrid:VariablePoint} |
| | Which players can perform selected roles? | SELECT ?role ?player WHERE { ?role smartGrid:acts ?player} | several tasks to be performed such that the parent node is achieved. The task-decomposition link is expressed as an AND relation. FIG. 3 illustrates that a smart grid system is modeled as the SR model of i*framework. FIG. 4 illustrates a goal model when the smart grid system is modeled as the SR model of i*framework. FIG. 5 illustrates a behavior feature model when the smart grid system is modeled as the SR model of i*framework. FIG. 6 illustrates an extended version of the behavior feature model of FIG. 5. FIG. 7 illustrates a component feature model when the smart grid system is modeled as the SR model of i*framework.

As illustrated in FIGS. 5 and 6, the behavior feature model is a model expressing all behaviors that the system can perform. A behavior feature refers to a behavior capable of achieving a specific goal. If a goal in a goal model expresses an ultimate goal that the system intends to achieve, the behavior feature model expresses which behaviors and features in unit of tasks are required to achieve the goal. In this case, the relation between features is defined as a mandatory, optional, alternative relation, to be used in expressing variability. In addition, a requires relation refers to a relation in which a required feature is necessarily performed when a requiring feature is performed.

As illustrated in FIG. 7, the component feature model is composed of combinations of components or sub-systems constituting the system. If the behavior feature represents a behavior performed in the system, a component feature is a feature expressing a subject of the behavior. Every feature of the component feature model is connected to features of the behavior feature model, so that it can be seen which behavior feature each component feature is to perform. As described above, the component features are used in the process of selecting players.

Figure 8:
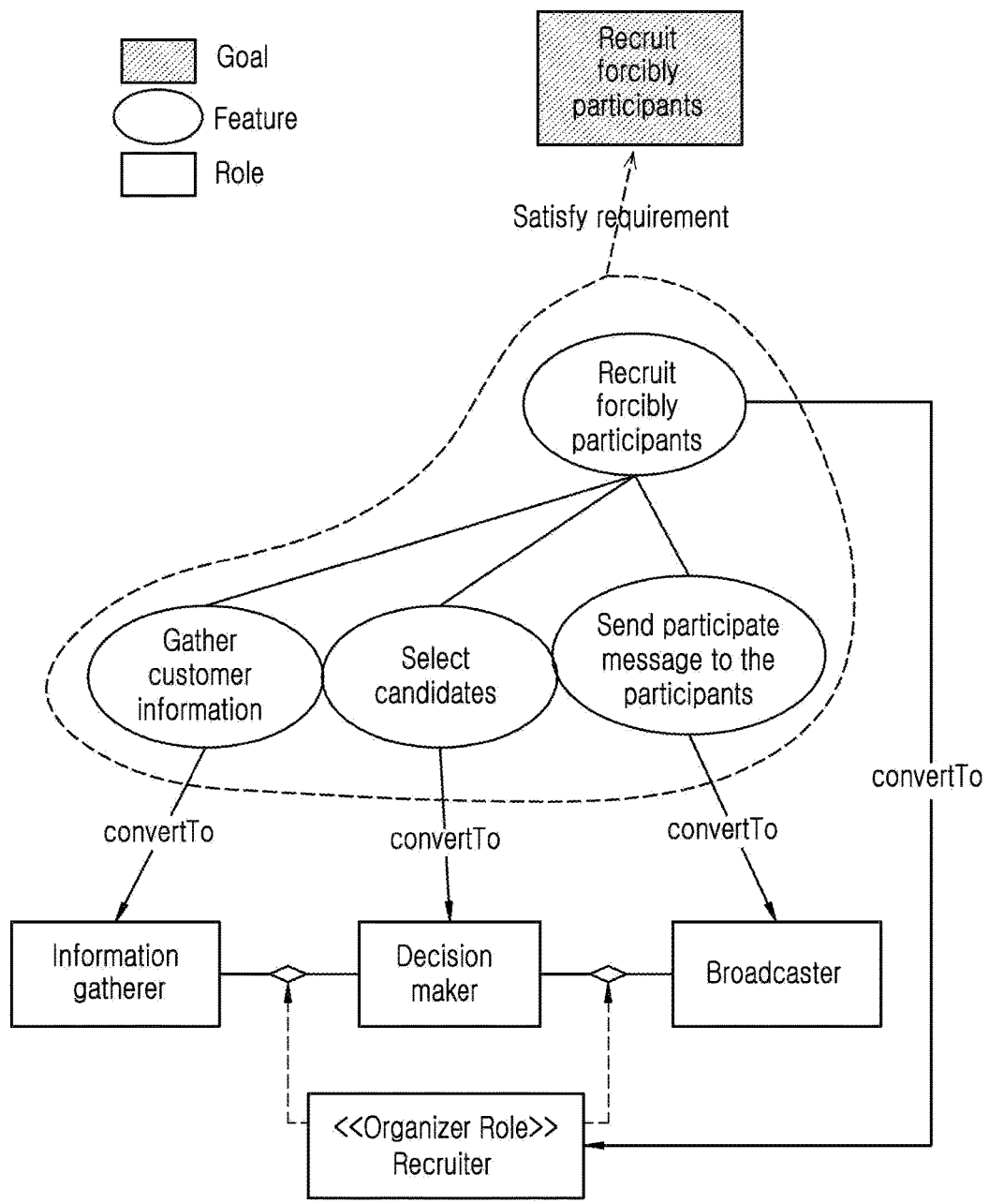
FIG. 8 illustrates that behavior features and roles are mapped as an example of a specific goal (forcible recruitment of power providers) of the smart grid system.

The behavior features selected as described above may become functional roles in the creation of the ROAD model, or a parent feature may be replaced with an organizer role. Hereinafter, it will be described how to define a relation between roles and features. In this description, the illustration of FIG. 8 is referred. FIG. 8 illustrates that behavior features and roles are mapped as an example of a specific goal (forcible recruitment of power providers) of the smart grid system.

Referring to FIG. 8, a set of features indicated by a dotted line satisfies a specific goal, i.e., recruit forcibly participants. Behavior features for achieving the goal are performed by an organization created by specific roles. In order to perform a feature set for satisfying a specific goal in a role-based architecture, it is determined by which organization features can be performed.

It may be previously defined as ontology by which organization behavior features for satisfying a specific goal of the self-adaptive system or behavior features extracted suitable for a context can be performed. This may be changed depending on a domain but generally divided into four structures of 1:1, 1:n, n:1, and n:n.

FIG. 8 illustrates a case (i.e., a 1:1 mapping case) where one behavior feature is performed by one role. In the 1:1 mapping case, a behavior feature is determined, and simultaneously, a role and an organization are immediately determined. In the illustration of FIG. 8, a gather customer information feature is 1:1 mapped to an information gather role, a select candidates feature is 1:1 mapped to a decision maker role, and a send participate message feature is 1:1 mapped to a boadcaster role. The recruit forcibly participants as a high-level feature of the above-described three features may be performed by a recruiter role as an organizer role. However, when all the features are 1:1 mapped as described above, the effect of variability is not obtained. Unlike the illustration of FIG. 8, when 1:n mapping (several roles are mapped to one feature), n:1 mapping (one role is mapped to several features), or n:n mapping (several roles are mapped to several features) is performed, the effect of variability can be obtained.

Figure 9:
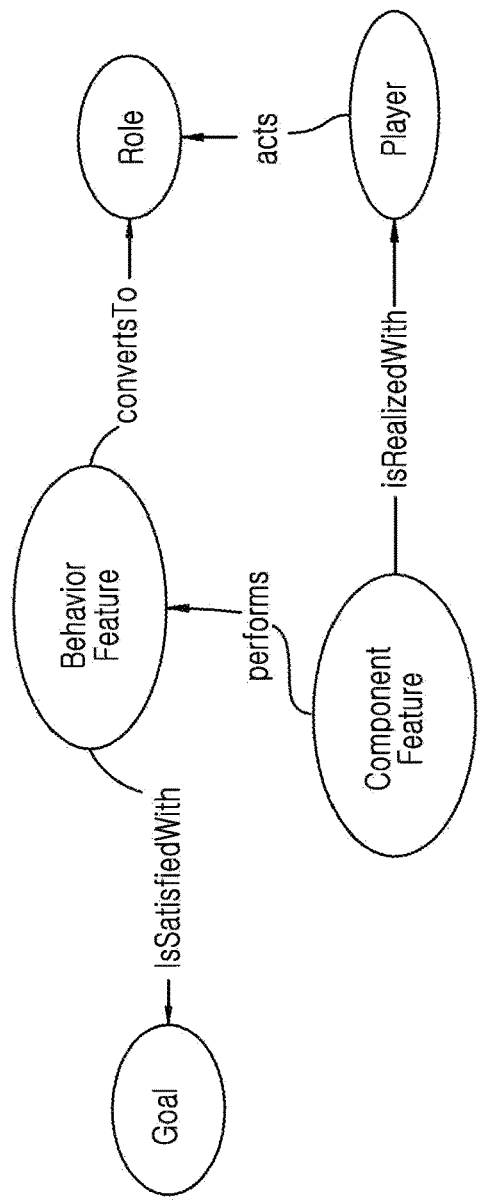
FIG. 9 is a view schematically expressing an attribute connection relation among a goal, a behavior feature, a component feature, a role, and a player.

In the embodiment of the inventive concept, the above-described relation among the goal, the behavior feature, the component feature, the role, and the player is expressed and used as ontology. FIG. 9 is a view schematically expressing an attribute connection relation among the goal, the behavior feature, the component feature, the role, and the player.

As described above, a goal to be achieved by the system can be satisfied as a behavior feature to be performed by the system is realized. The behavior feature is converted into roles to be performed by sub-systems or components. When a player to perform a role is searched for the purpose of adaptation, the component feature model can be used. This is because players are ones realized as if component features are actually operated.

Variability can be provided to five parts through the model proposed according to the embodiment of the inventive concept. The variability is expressed as one which is necessarily performed between high-level and low-level features (mandatory), one which can be selected (optional), or one which is to be selected from optional features (alternative). As a component feature capable of performing both two behavior features is connected, the variability occurs. Also, the variability occurs between an actually selected role and a player for performing the actually selected role.

Figure 10:
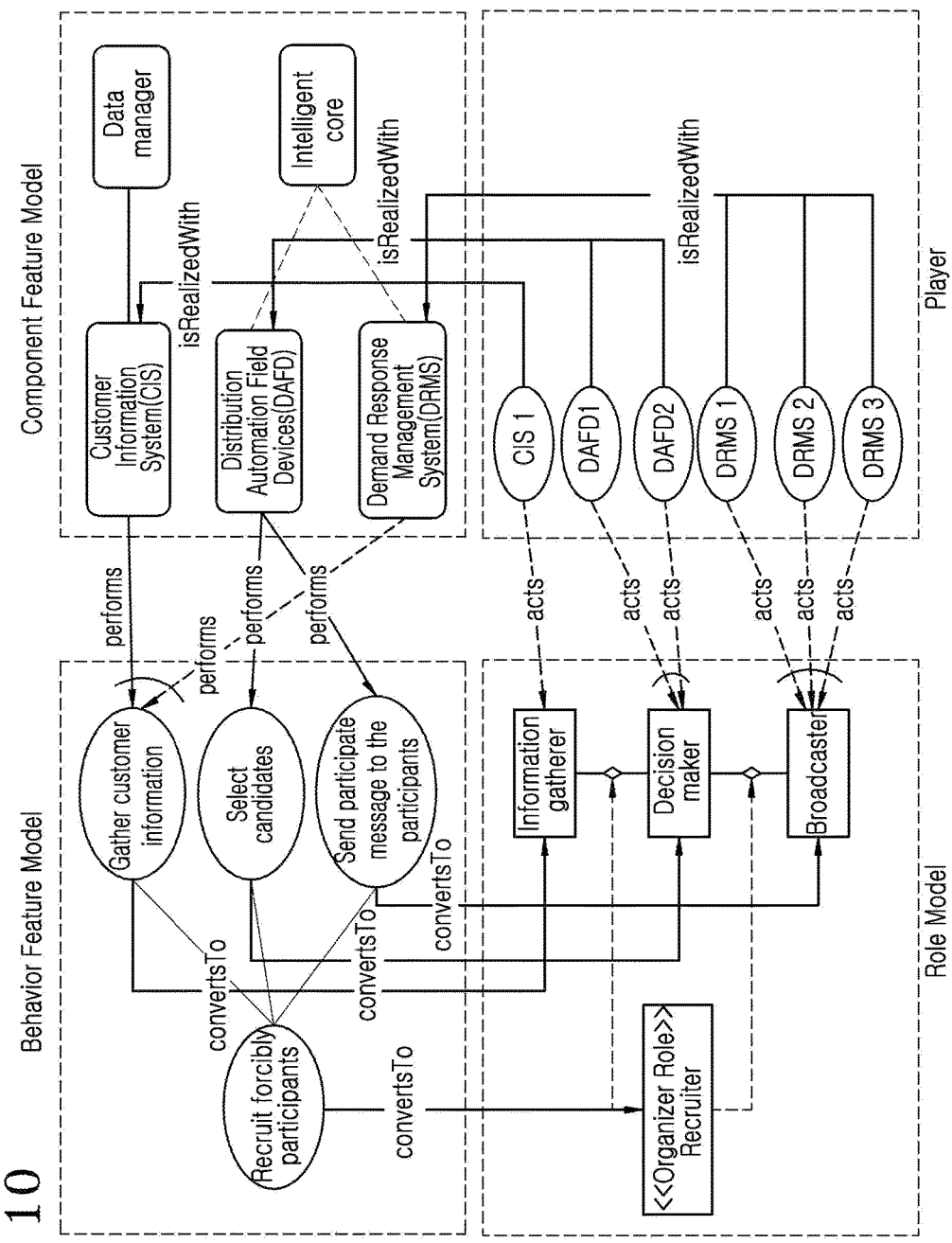
FIG. 10 illustrates a model expressing a relation among a behavior feature model, a component feature model, a role model, and players as an example of the specific goal (forcible recruitment of power providers) of the smart grid system.

FIG. 10 illustrates that the above-described concept is applied to smart grid modeling. When a problem of power shortage occurs in a smart grid context, components in the smart grid system supply power through autonomous or forcible participation, thereby solving the problem. FIG. 10 illustrates a case where the recruitment of participants is forcibly made when the problem of power shortage occurs. That is, FIG. 10 illustrates a model expressing a relation among a behavior feature model, a component feature model, a role model, and players as an example of the specific goal (forcible recruitment of power providers) of the smart grid system. In order to forcibly recruit participants, candidates to supply energy are selected, and a message for participation is sent to the candidates so as to gather all energy statuses of the components and send them to a place where the problem occurred. In FIG. 10, three behavior features set as described above may be changed into an organization created by an organizer role called "Recruiter." Also, in FIG. 10, a customer information system (CIS) as a component feature for gathering information of components is a system which manages information of customers. A component feature of selecting candidates definitely acts as a distribution automation field device (DAFD) in the selection of candidates. A component feature for transmitting participation messages to participants may be implemented as a demand response management system (DRMS).

The above-described variability modeling method for the role based architecture in the ontology based self-adaptive system according to the inventive concept can be implemented on a computer-readable recording medium as a computer-readable code. The computer-readable recording medium includes all kinds of recording media on which data can be stored in a manner by which the data can be read by a computer system. The computer-readable recording medium includes a read only memory (ROM), a random access memory (RAM), a flash memory, an optical data storage, and the like. In addition, the computer-readable recording medium can be stored and executed as codes which can be distributed to computer systems connected through a computer communication network and can be read through a distribution method.

According to embodiments of the inventive concept, the flexibility of a structure can be obtained through the role-based architecture. Further, feature models are used, so that it is possible to derive various solutions in an adaptation process by considering variability in the adaptation process.

Also, according to embodiments of the inventive concept, it is possible to express a goal of the system and create a specific model by using the SR model of i*framework. Further, it is possible to consider a more complex context in the adaptation process by applying a self-adaptive software framework using the ontology.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the inventive concept.

What is claimed is:

1. A variability modeling method implemented in a computer system to implement a self-adaptive system, the variability modeling method comprising:

building ontology in which a target system to be modeled is defined through requirement analysis of the target system, wherein, in the ontology, a behavior feature required to achieve a goal of the target system and a component feature to perform the behavior feature are related to roles and players of a role-based architecture, and a variable point is defined in their relation;

deciding whether adaptation is required by continuously monitoring the target system and a change in environment; and when it is decided that the adaptation is required, performing reconfiguration of the target system by determining the variable point suitable for a change in context, wherein, in the ontology, there are defined a goal model for defining a plurality of goals required to be achieved in the target system, a behavior feature model for defining at least one behavior required to achieve each goal, and a component feature model for defining at least one component to perform each behavior, and wherein each feature in the behavior feature model and the component feature model is defined as a mandatory, optional, or alternative relation such that the variable point is expressed.

2. The variability modeling method of claim 1, wherein the goal model is defined based on a strategic rationale (SR) model of i*framework, including a goal of the target system, derived through the requirement analysis, an actor which is a subject to achieve the goal, and a task processed by the actor, and wherein the behavior feature model is derived from the task derived from the goal model, and the component feature model is derived by the actor derived from the goal model.

3. The variability modeling method of claim 1, comprising when it is decided that the adaptation is required, determining, by a reasoning engine, the variable point through a query to the ontology.

4. The variability modeling method of claim 3, wherein the reasoning engine determines the variable point at which the reconfiguration of the target system is to be performed by changing a feature in the optional or alternative relation in each feature model.

5. The variability modeling method of claim 3, wherein, when mapping between the variable point is generated as the behavior feature and the role in the role-based architecture and mapping between the component feature and the player in the role-based architecture are performed through an n:1, 1:n, or n:n relation, the reasoning engine determines the variable point at which the reconfiguration of the target system is to be performed by changing a role and a player in the mapping relation.

6. The variability modeling method of claim 3, comprising determining from which process the adaptation is to be performed, according to the determined variable point, among the process of changing the goal, the process of changing at least one feature among the behavior features and the component features, the process of changing the role, and the process of changing the player.

* * * * *